United States Patent
No et al.

(10) Patent No.: US 10,740,413 B2
(45) Date of Patent: Aug. 11, 2020

(54) SYSTEM AND METHOD FOR USER INFORMATION MANAGEMENT VIA A USER INTERFACE PAGE

(71) Applicant: salesforce.com, inc., San Francisco, CA (US)

(72) Inventors: Jamie No, Lynnwood, WA (US); Michelle Jowitt, Oakland, CA (US); Eugene Li, Saratoga, CA (US); Theresa Vietvu, Sunnyvale, CA (US); Carol Franger, Berkeley, CA (US)

(73) Assignee: salesforce.com, inc., San Francisco, CA (US)

( * ) Notice: Subject to any disclaimer, the term of this patent is extended or adjusted under 35 U.S.C. 154(b) by 183 days.

(21) Appl. No.: 14/529,025

(22) Filed: Oct. 30, 2014

(65) Prior Publication Data
US 2015/0121269 A1 Apr. 30, 2015

Related U.S. Application Data

(60) Provisional application No. 61/897,354, filed on Oct. 30, 2013.

(51) Int. Cl.
| | |
|---|---|
| *G06F 3/0482* | (2013.01) |
| *G06F 3/048* | (2013.01) |
| *G06F 16/24* | (2019.01) |
| *G06F 16/95* | (2019.01) |
| *G06F 16/951* | (2019.01) |
| *G06F 16/242* | (2019.01) |

(52) U.S. Cl.
CPC ............ *G06F 16/951* (2019.01); *G06F 3/048* (2013.01); *G06F 3/0482* (2013.01); *G06F 16/242* (2019.01)

(58) Field of Classification Search
CPC . G06F 17/30; G06F 3/048; G06F 3/00; G06F 3/0482; G06Q 50/00
See application file for complete search history.

(56) References Cited

U.S. PATENT DOCUMENTS

| | | |
|---|---|---|
| 5,485,175 A | 1/1996 | Suzuki |
| 5,577,188 A | 11/1996 | Zhu |
| 5,608,872 A | 3/1997 | Schwartz et al. |

(Continued)

OTHER PUBLICATIONS

Final Office Action from U.S. Appl. No. 14/529,023 dated Aug. 28, 2017, 14 pages.

(Continued)

*Primary Examiner* — Hugo Molina
(74) *Attorney, Agent, or Firm* — Jaffrey Watson Mendonsa & Hamilton LLP

(57) ABSTRACT

Techniques and/or mechanisms to provide efficient system user management via a user interface (UI) page. In one embodiment, a search string is received via a dialog box of a UI page. Based on the search string, a first list is provided for display in the UI page, the first list including one or more items each representing a respective user of a plurality of users. Based on a focus on a first item of the first list, a second list is displayed in the UI page, the second list including one or more items each representing a respective a user management command corresponding to the user represented by the first item. Based on a focus on a second item of the second list, a user management command is executed without requiring navigation away from the UI page.

15 Claims, 14 Drawing Sheets

(56) References Cited

U.S. PATENT DOCUMENTS

| | | | |
|---|---|---|---|
| 5,649,104 A | 7/1997 | Carleton et al. | |
| 5,715,450 A | 2/1998 | Ambrose et al. | |
| 5,761,419 A | 6/1998 | Schwartz et al. | |
| 5,819,038 A | 10/1998 | Carleton et al. | |
| 5,821,937 A | 10/1998 | Tonelli et al. | |
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,229,533 B1* | 5/2001 | Farmer | G06F 3/04815 345/473 |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec | |
| 6,324,693 B1 | 11/2001 | Brodersen et al. | |
| 6,336,137 B1 | 1/2002 | Lee et al. | |
| D454,139 S | 3/2002 | Feldcamp | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu et al. | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier et al. | |
| 6,654,032 B1 | 11/2003 | Zhu et al. | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu et al. | |
| 6,768,904 B2 | 7/2004 | Kim | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker et al. | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,289,976 B2 | 10/2007 | Kihneman et al. | |
| 7,340,411 B2 | 3/2008 | Cook | |
| 7,620,655 B2 | 11/2009 | Larsson et al. | |
| 7,640,517 B2 | 12/2009 | Moehrle | |
| 8,127,249 B2* | 2/2012 | Deggelmann | G06F 3/048 715/752 |
| 8,275,786 B1 | 9/2012 | Dave | |
| 8,301,668 B1 | 10/2012 | He | |
| 8,356,041 B2 | 1/2013 | Paek et al. | |
| 8,463,246 B2* | 6/2013 | Gueron | H04W 8/205 455/414.1 |
| 9,311,362 B1* | 4/2016 | Trew | G06F 17/30554 |
| 9,619,582 B1 | 4/2017 | Djabarov | |
| 9,665,615 B2 | 5/2017 | Kulkarni et al. | |
| 2001/0044791 A1 | 11/2001 | Richter et al. | |
| 2002/0018080 A1* | 2/2002 | Ageta | G06F 1/1616 715/810 |
| 2002/0022986 A1 | 2/2002 | Coker et al. | |
| 2002/0029161 A1 | 3/2002 | Brodersen et al. | |
| 2002/0029376 A1 | 3/2002 | Ambrose et al. | |
| 2002/0035577 A1 | 3/2002 | Brodersen et al. | |
| 2002/0042264 A1 | 4/2002 | Kim | |
| 2002/0042843 A1 | 4/2002 | Diec | |
| 2002/0047866 A1 | 4/2002 | Matsumoto | |
| 2002/0072951 A1 | 6/2002 | Lee et al. | |
| 2002/0082892 A1 | 6/2002 | Raffel et al. | |
| 2002/0129352 A1 | 9/2002 | Brodersen et al. | |
| 2002/0140731 A1 | 10/2002 | Subramaniam et al. | |
| 2002/0143997 A1 | 10/2002 | Huang et al. | |
| 2002/0152102 A1 | 10/2002 | Brodersen et al. | |
| 2002/0161734 A1 | 10/2002 | Stauber et al. | |
| 2002/0162090 A1 | 10/2002 | Parnell et al. | |
| 2002/0165742 A1 | 11/2002 | Robins | |
| 2003/0004971 A1 | 1/2003 | Gong et al. | |
| 2003/0018705 A1 | 1/2003 | Chen et al. | |
| 2003/0018830 A1 | 1/2003 | Chen et al. | |
| 2003/0066031 A1 | 4/2003 | Laane | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker | |
| 2003/0088545 A1 | 5/2003 | Subramaniam et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0182463 A1* | 9/2003 | Valk | G06F 9/4443 719/310 |
| 2003/0187921 A1 | 10/2003 | Diec | |
| 2003/0189600 A1 | 10/2003 | Gune et al. | |
| 2003/0191743 A1 | 10/2003 | Brodersen et al. | |
| 2003/0204427 A1 | 10/2003 | Gune et al. | |
| 2003/0206192 A1 | 11/2003 | Chen et al. | |
| 2003/0225730 A1 | 12/2003 | Warner et al. | |
| 2004/0001092 A1 | 1/2004 | Rothwein et al. | |
| 2004/0006606 A1* | 1/2004 | Marotta | G06F 17/30017 709/219 |
| 2004/0010489 A1 | 1/2004 | Rio | |
| 2004/0015981 A1 | 1/2004 | Coker et al. | |
| 2004/0021647 A1* | 2/2004 | Iwema | G06F 3/0488 345/179 |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan, Jr. et al. | |
| 2004/0199489 A1 | 10/2004 | Barnes-Leon et al. | |
| 2004/0199536 A1 | 10/2004 | Barnes Leon et al. | |
| 2004/0199543 A1 | 10/2004 | Braud et al. | |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0267595 A1* | 12/2004 | Woodings | G06Q 10/06 705/7.14 |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2006/0036945 A1* | 2/2006 | Radtke | G06F 9/4443 715/708 |
| 2007/0100650 A1 | 5/2007 | Ramer | |
| 2007/0113201 A1* | 5/2007 | Bales | G06F 8/38 715/810 |
| 2008/0313574 A1* | 12/2008 | Aravamudan | G06F 17/30899 715/854 |
| 2009/0177625 A1 | 7/2009 | Saxena | |
| 2009/0177744 A1 | 7/2009 | Marlow et al. | |
| 2009/0210821 A1* | 8/2009 | Omiya | G06F 3/0482 715/808 |
| 2009/0313573 A1* | 12/2009 | Paek | G06F 16/3322 715/780 |

(56) References Cited

U.S. PATENT DOCUMENTS

| | | | |
|---|---|---|---|
| 2010/0106864 A1* | 4/2010 | Li | H04W 4/70 710/17 |
| 2010/0138782 A1* | 6/2010 | Rainisto | G06F 3/0482 715/808 |
| 2010/0185970 A1* | 7/2010 | Benenson | G06F 3/0482 715/772 |
| 2010/0306228 A1 | 12/2010 | Carpenter | |
| 2010/0306259 A1 | 12/2010 | Svinth | |
| 2011/0191317 A1* | 8/2011 | Lee | G06F 17/30 707/706 |
| 2012/0136887 A1 | 5/2012 | Cha | |
| 2012/0144469 A1* | 6/2012 | Ainslie | G06F 3/0481 726/7 |
| 2012/0151363 A1* | 6/2012 | Palmer | G06F 8/60 715/736 |
| 2012/0192096 A1 | 7/2012 | Bowman | |
| 2012/0310927 A1* | 12/2012 | Johnson | G06F 16/24578 707/723 |
| 2012/0331137 A1* | 12/2012 | Olsen | G06Q 30/02 709/224 |
| 2013/0002567 A1* | 1/2013 | Lee | G06F 3/04883 345/173 |
| 2013/0117681 A1* | 5/2013 | Veys | G06F 3/048 715/739 |
| 2013/0125052 A1* | 5/2013 | Baird | G06F 3/0482 715/810 |
| 2013/0227482 A1* | 8/2013 | Thorsander | G06F 3/0482 715/821 |
| 2014/0101068 A1* | 4/2014 | Gidugu | G09B 7/02 705/327 |
| 2014/0310649 A1* | 10/2014 | Bernstein | G06F 3/0482 715/808 |
| 2015/0032489 A1* | 1/2015 | Yanchenko | G06Q 10/06311 705/7.13 |
| 2015/0082218 A1 | 3/2015 | Affoneh | |
| 2015/0213094 A1* | 7/2015 | Lou | G06F 3/0485 707/722 |

OTHER PUBLICATIONS

Office Action from U.S. Appl. No. 14/529,023 dated Dec. 13, 2017, 12 pages.

Final Office Action from U.S. Appl. No. 14/529,023, 14 pages, dated Jun. 27, 2018.

Notice of Allowance from U.S. Appl. No. 14/529,023, 16 pages, dated Jun. 25, 2019.

Office Action from U.S. Appl. No. 14/529,023, 16 pages, dated Jan. 2, 2019.

* cited by examiner

SYSTEM AND METHOD FOR USER INFORMATION MANAGEMENT VIA A USER INTERFACE PAGE

PRIORITY AND RELATED APPLICATION DATA

This application claims priority to Provisional U.S. Patent Application Ser. No. 61/897,354, filed on Oct. 30, 2013, entitled "SYSTEM AND METHOD FOR SYSTEM USER MANAGEMENT," which is incorporated herein by reference in its entirety and for all purposes.

This application is related to U.S. patent application Ser. No. 14/529,023, filed on Oct. 30, 2014, entitled "SYSTEM AND METHOD FOR METADATA MANAGEMENT VIA A USER INTERFACE PAGE."

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

1. Technical Field

One or more implementations relate generally to search techniques and, more specifically, to a mechanism for facilitating improved and/or more intuitive search interfaces.

2. Background Art

Typical search interfaces using computing devices involve one or more fields where a user may type search terms. Often, a search result provides an operator with a link to navigate away from a current user interface (UI) page to a subsequent UI page corresponding to the selected result. This subsequent UI page may have no search functionality, or search functionality that is different from that of the preceding UI page. While this type of search experiences has become relatively common, is not necessarily efficient in situations where multiple functions have to be performed each for it different result of such a search.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Embodiments discussed here in variously provide methods and/or systems to facilitate an improved search experience. Large organizations may have tens of thousands of users that system administrators must manage. Common administrative tasks include resetting user passwords, deactivating users, updating email addresses, and so on. Navigating to the details of a particular user can be overly time-consuming and tedious, requiring scanning and paging through long multi-page lists. Certain embodiments variously provide techniques and/or mechanisms to enable efficient system user management.

In one embodiment, a system receives a search string via a dialog box of a UI page. For example, a system administrator may enter a username into a search box in a setup page. The system may determine whether the input matches, for example, at least a portion of an identifier of a system user of multiple identifiers of system users. The system may autocomplete the search string—e.g., by suggesting a remainder of a username or options to complete any of multiple different usernames.

Based on the search string, the system may provide for display in the UI page a first list of items each indicating a respective user. Focus on (e.g., selection of) an item of the first list via the UI page may result in a display of a second list of one or more items corresponding to the user. The one or more items of the second list may each represent a user management command. Selection of an item of the second list may result in execution of the corresponding user management command—e.g., wherein the command is executed without requiring navigation away from the UI page.

Figure 1:
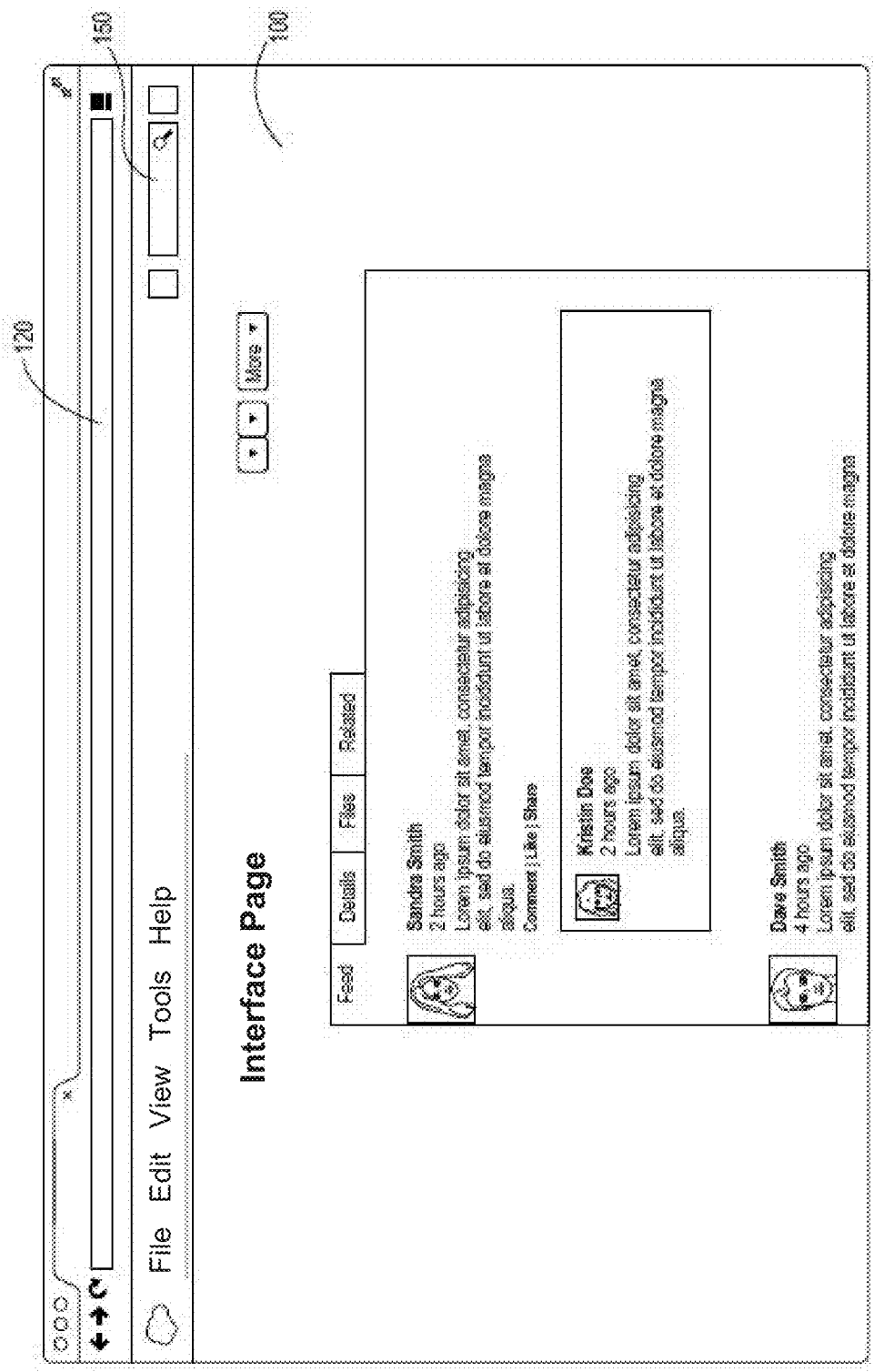
FIG. 1 is a graphical illustration of one embodiment of a search screen that may be provided by a system utilizing the search functionality as described herein.

FIG. 1 is a graphical illustration of one embodiment of a user interface (UI) comprising a page 100 that may be provided by a system utilizing a search functionality as described herein. Page 100 may include any number of items useful to a user—e.g., including, but not limited to, the illustrative tabs (Feed, Details, Files, Related) show. In one embodiment, page 100 is accessible via a browser application having window 120 to allow the user to navigate. Page 100 may include search box 150. Any number of mechanisms (e.g., dialog boxes, drop down menus, pop-up menus, keyboard shortcuts, input device selections, audio input, for example, voice commands, eye tracking input) to access search functionality can be supported.

Figure 2A:
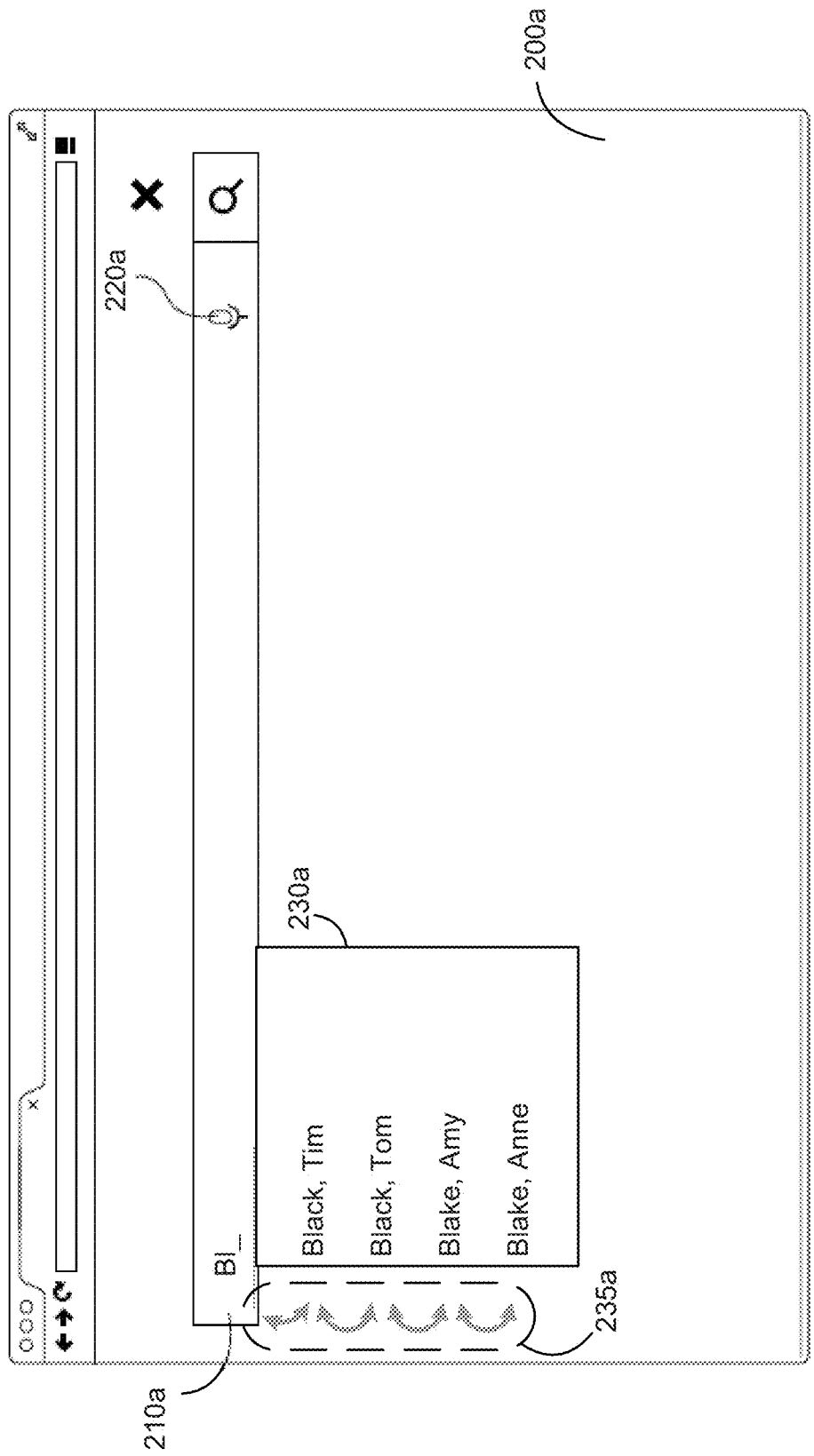
FIGS. 2A through 2D are graphical illustrations of various UI pages having functionality that may be provided by a system utilizing the search functionality as described herein.

FIG. 2A is a graphical illustration of a UI page 200*a* having a list that may be provided by a system utilizing the search functionality as described herein. UI page 200*a* may comprise some or all of the features of page 100, for example. In one embodiment, UI page 200*a* is accessible via a browser application; however, other applications may provide similar search functionality. Search dialog box 210*a* (e.g. search box 150) may be utilized for entering a search string.

Search strings may be entered by typing or otherwise providing input through an input device (e.g., a keyboard, touchscreen, microphone, etc.). In one embodiment, audio input trigger 220*a* may be utilized to provide audio input (e.g., speech input) to dialog box 210*a*. Any speech-to-text technology may be used to receive speech inputs and enter them into dialog box 210*a*. Although certain arguments are not limited in this regard, UI page 200*a* may include other UI elements (not shown) to provide access to useful links, shortcuts and/or other resources.

Based on such a search string, UI page 200*a* may be updated to show a list of users (e.g., including one or more people, network nodes, corporate entities, government entities and/or the like) associated with the search string. A user may be represented in such a list where, for example, a search string entered in dialog box 210*a* matches at least part of the user's name, the user's location, the user's employer or other information associated with the user.

In the example of FIG. 2A, a string of characters "B1" has been entered into dialog box 210*a*. This may be a partial or a complete search string and may have been entered by a keyboard or other alphanumeric input or via speech input. In one embodiment, an auto-complete functionality fills in results that match a string of characters that a user has input to dialog box 210*a*—e.g. as the user is typing. In response to the input at dialog box 210*a*, the search mechanism can provide list 230*a* including or otherwise representing one or more users each corresponding in some respect with the input string "B1". List 230*a* may be organized alphabetically and/or by type. Such types may include one or more of groups, accounts and topics. These are merely example types and many other types can also be supported.

In an embodiment, a user may operate one or more input devices to variously transition a focus between different UI elements of page 200*a* at different times. Such UI elements may include, for example, dialog box 210*a* and individual items in list 230*a*. Focus on a given UI element may select a functionality associated with that UI element, or enable such selection. For example, focus on dialog box 210*a* may enable string characters to be entered in dialog box 210*a*. By contrast, focus on an item in list 230*a* may enable a second list (not shown) to be displayed in page 200*a*—e.g., wherein, of the items of list 230*a*, the second list is specific to the item that is currently in-focus. As used herein, "in-focus" refers to a UI element that currently has focus, and "out-of-focus" is used to characterize the UI element that does not currently have focus.

Although certain embodiments are not limited in this regard, successive transitions of focus among UI items of page 200*a* may be according to a pre-defined sequence, referred to herein as a "focus sequence." For example, a first focus sequence 235*a* (illustrated by the arrows shown in FIG. 2A) may include a focus on dialog box 210*a* and successive focuses on the respective items of list 230*a*. It will be understood that the illustrative arrows representing a given focus sequence may not actually be displayed in a UI page.

One particular type of input from a keyboard, touchpad, microphone, etc. may trigger successive transitions of focus among these UI elements according to a given focus sequence 235*a*. By way of illustration and not limitation, a particular arrow key Tab key, Spacebar key, or other input may successively trigger transitions along the first focus sequence 235*a* in one direction. Alternatively or in addition, a different arrow key or other input may successively trigger transitions along the first focus sequence 235*a* in an opposite direction. In some embodiments, focus on a UI element of the first focus sequence 235*a* may be alternatively implemented other means—e.g. by a user selecting the UI element with a cursor.

Figure 2B:
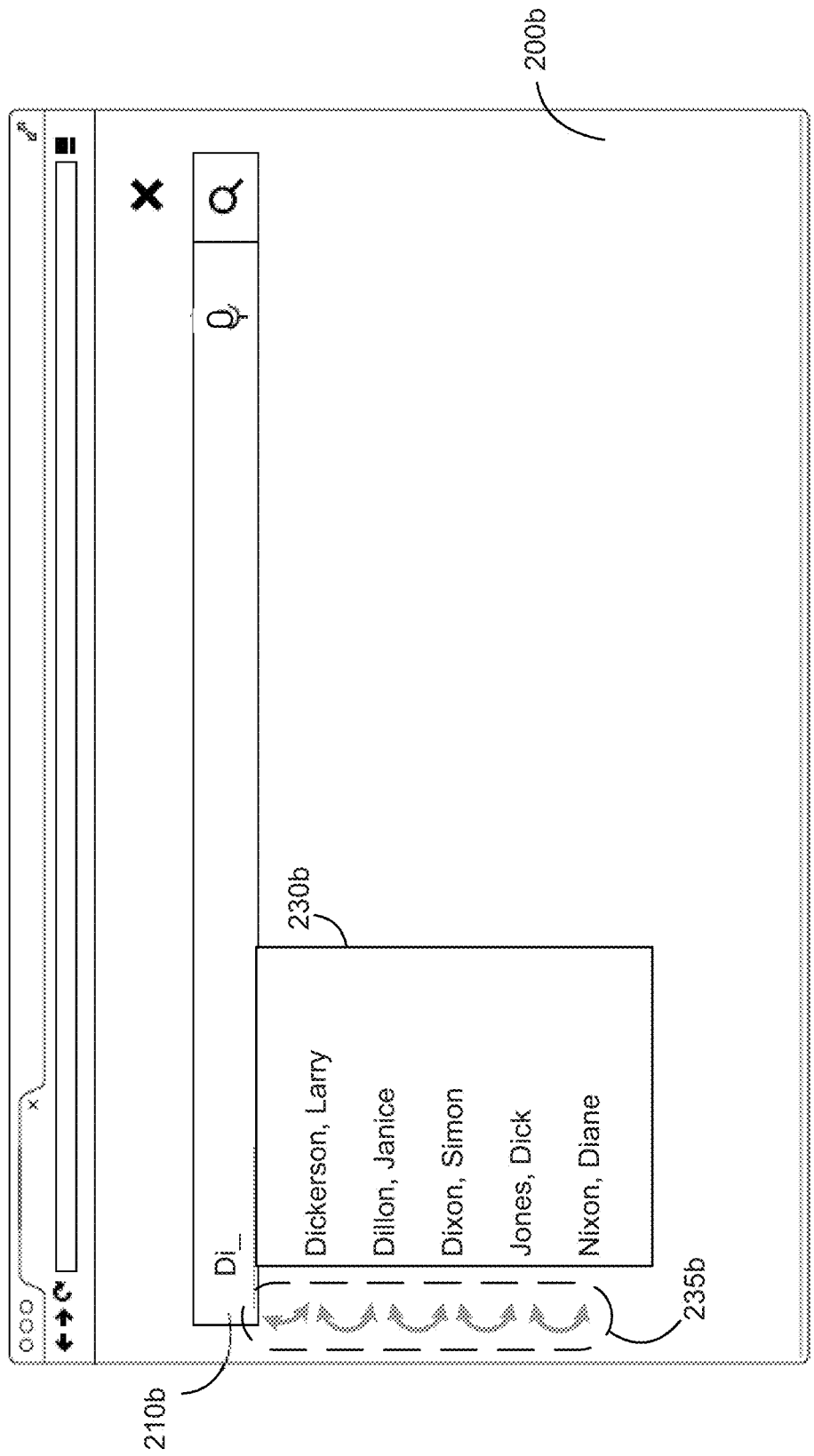

FIG. 2B is a graphical illustration of a UI page 200*b* having a list that may be provided by a system utilizing the search functionality as described herein. UI page 200*b* may have some or all of the features of UI page 200*a*, for example. In the example of FIG. 2B, a different string of characters "Di" has been entered into dialog box 210*b*. This may be a partial or a complete search string and may have been entered by a keyboard or other alphanumeric input or via speech input. In response to the input at dialog box 210*b*, the search mechanism can provide a different list 230*b* including one or more users each corresponding in some respect with the input string "Di". A predefined focus sequence 235*b* of page 200*b* (illustrated by the arrows shown in FIG. 2B) may include a focus on dialog box 210*b* and successive focuses on the respective items of list 230*b*. Focus on an item in list 230*b* may enable a second list (not shown) to be displayed in page 200*b*—e.g., wherein, of the items of list 230*b*, the second list is specific to the item that is currently in-focus.

Figure 2C:
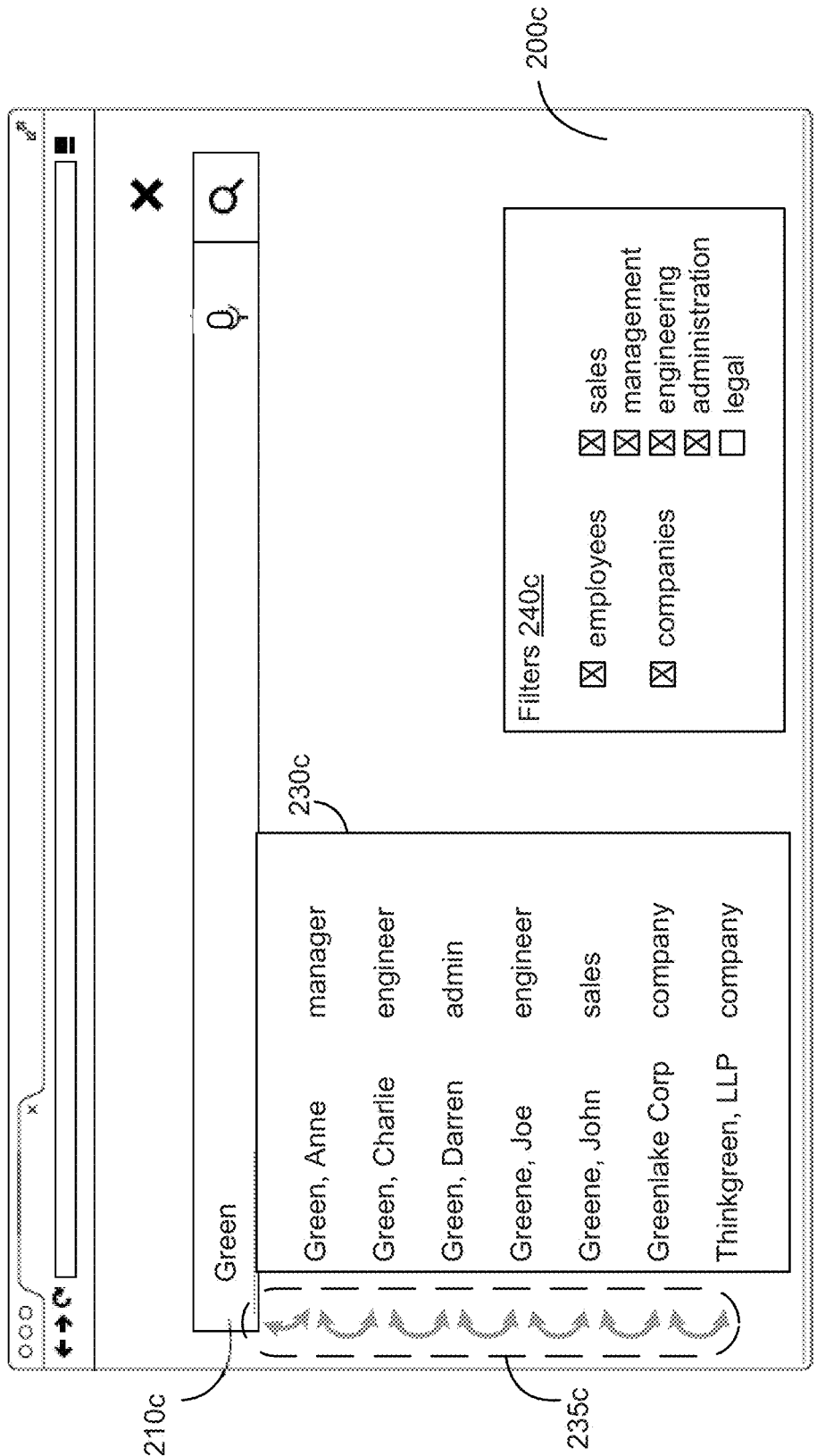

FIG. 2C is a graphical illustration of a UI page 200*c* having a list that may be provided by a system utilizing the search functionality as described herein. UI page 200*c* may have some or all of the features of UI page 200*a*, for example. In the example of FIG. 2C, a different string of characters "Green" has been entered into dialog box 210*c*. In response to the input at dialog box 210*c*, the search mechanism can provide a different list 230*c* including one or more users each corresponding in some respect with the input string "Green". A predefined focus sequence 235*c* of page 200*c* (illustrated by the arrows shown in FIG. 2C) may include a focus on dialog box 210*c* and successive focuses on the respective items of list 230*c*. Focus on an item in list 230*c* may enable a second list (not shown) to be displayed in page 200*c*.

UI page 200*c* may provide search filtering with filters 240*c* that are selectable by a user to variously define one or more types of information that are to be included in (or excluded from) consideration in a search based on the input provided at dialog box 210*c*. By way of illustration and not limitation, filters 240*c* may be configured to specify whether users to be identified in list 230*c* may include employees and/or companies. Filters 240*c* may be configured to further specify, for example, whether employees with particular titles or departments are to be identified in list 230*c*. However, any of a variety of additional or alternative search filters may be provided, according to different embodiments. In an illustrative scenario according to one embodiment, filters 240*c* are configured to include in list 230*c* both companies and employees belonging to various departments (sales, marketing, engineering, administration) other than a legal department. Items of list 230*c* may include a name of a user and, in some embodiments, additional context information associated with that user, as represented by the illustrative department identifiers shown.

Figure 2D:
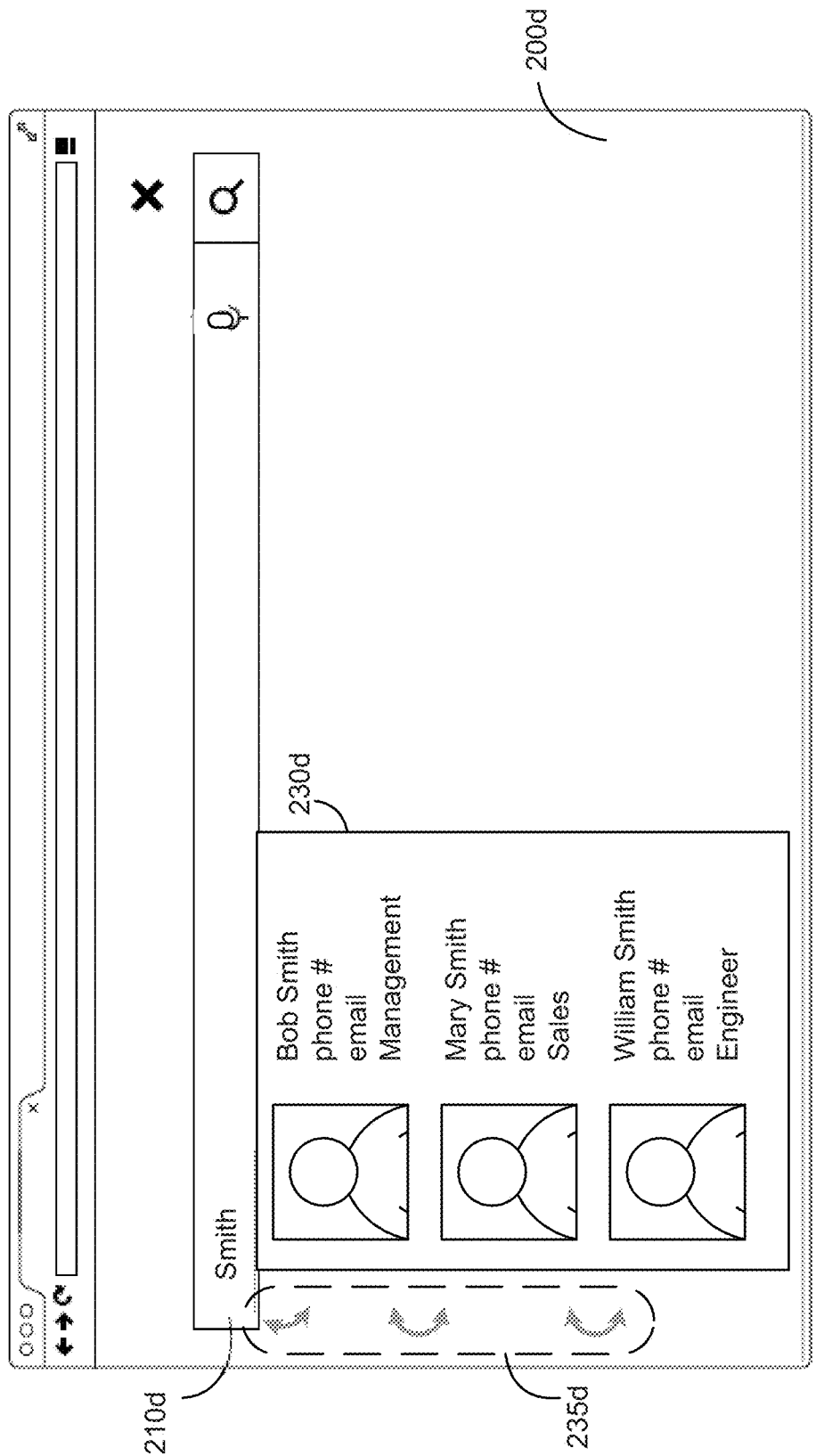

FIG. 2D is a graphical illustration of a UI page 200d having a list that may be provided by a system utilizing the search functionality as described herein. UI page 200d may have some or all of the features of UI page 200a, for example. In the example of FIG. 2D, a different string of characters "Smith" has been entered into dialog box 210d. This may be a partial or a complete search string and may have been entered by a keyboard or other alphanumeric input or via speech input. In response to the input at dialog box 210d, the search mechanism can provide a different list 230d including one or more users each corresponding in some respect with the input string "Smith.". A predefined focus sequence 235d of page 200d (illustrated by the arrows shown in FIG. 2D) may include a focus on dialog box 210d and successive focuses on the respective items of list 230d. Focus on an item in list 230d may enable a second list (not shown) to be displayed in page 200d—e.g., wherein, of the items of list 230d, the second list is specific to the item that is currently in-focus. Items of list 230d may each include an identifier of a corresponding user, as well as other information associated with that user. By way of illustration and not limitation, an item of list 230d may include a name, photograph, phone number, email address, department and/or other information for that user.

Certain embodiments variously provide for display of a second list in a UI page 300 based on an item of a first list of the UI page being in-focus—e.g., where the first list is a search result and wherein the item of the first list is highlighted, hovered-over by a cursor and/or clicked on or otherwise selected. Various features of such embodiments are discussed with reference to FIGS. 3A, 3B, 4A and 4B in the context of a first list such as the list 230b shown in FIG. 2B. However, such discussion may be extended to additionally or alternatively apply to any of a variety of other such first lists (e.g., any of lists 230a, 230c, 230d), according to different embodiments.

Figure 3A:
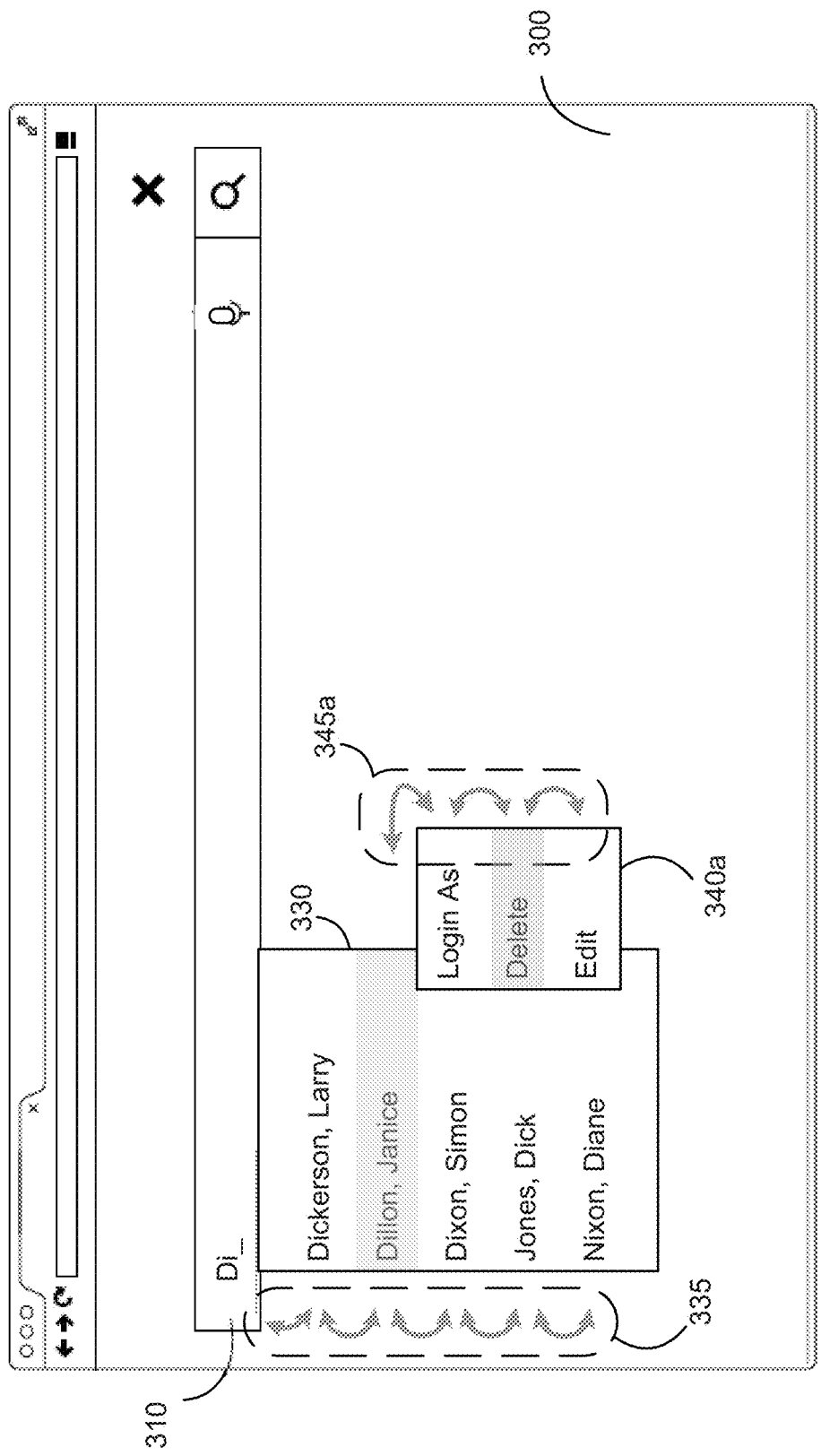
FIGS. 3A and 3B are graphical illustrations of various UI pages having functionality that may be provided by a system utilizing the search functionality as described herein.

FIG. 3A is a graphical illustration of a UI page 300 having a list that may be provided by a system utilizing the search functionality as described herein. UI page 300 may have some or all of the features of UI page 200b, for example. In the example of FIG. 3A, a string of characters "Di" has been entered into dialog box 310, where a first list 330 of users is displayed based on the search string "Di". A first focus sequence 335 of page 300 (illustrated by the arrows shown in FIG. 3A) may include a focus on dialog box 310 and successive focuses on the respective items of list 330.

Focus on a particular item in list 330—e.g., the user "Dillon, Janice"—may enable a second list 340a to be displayed in page 300. For example, second list 340a may be displayed in response to the item of the second list 340a being highlighted, hovered-over by a cursor and/or clicked on or otherwise selected. Of the items of list 330, some or all items of the second list 340a may each be specific to the in-focus item representing user "Dillon, Janice". In one embodiment, selection of an item of second list 340a enables execution of a respective function corresponding to the user "Dillon, Janice"—e.g., where such execution may take place without the user having to leave UI page 300. In the illustrative embodiment represented in FIG. 3A, the items of second list 340a are variously selectable to allow an operator to login to a system as "Dillon, Janice," to delete a user account for "Dillon, Janice," or to edit the user account for "Dillon, Janice." However, the particular functionality provided by the items of second list 340a are merely illustrative, and not limiting on certain embodiments.

A predefined second focus sequence 345a of page 300 (illustrated by the arrows shown in FIG. 3A) may include a focus on the "Dillon, Janice" item of first list 330 and successive focuses on respective items of second list 340a. Accordingly, the second focus sequence 345a may function as a branch from the first focus sequence 335 at the "Dillon, Janice" item of first list 330. Different types of inputs may allow a user to variously transition a focus in along the first focus sequence 335, between the first focus sequence 335 and the second focus sequence 345a, and/or along the second focus sequence 345a. By way of illustration and not limitation, an up arrow key and a down arrow key may be used to transition focus in respective directions along the first focus sequence 335, and may be additionally or alternatively used to transition focus in respective directions along the second focus sequence 345a. A right arrow key and/or a left arrow key may be used to transition focus between the "Dillon, Janice" item of first list 330 and an item of second list 340a. In some embodiments, focus on a UI element of the second focus sequence 345a may be alternatively implemented other means—e.g. by a user selecting the UI element with a cursor.

Figure 3B:
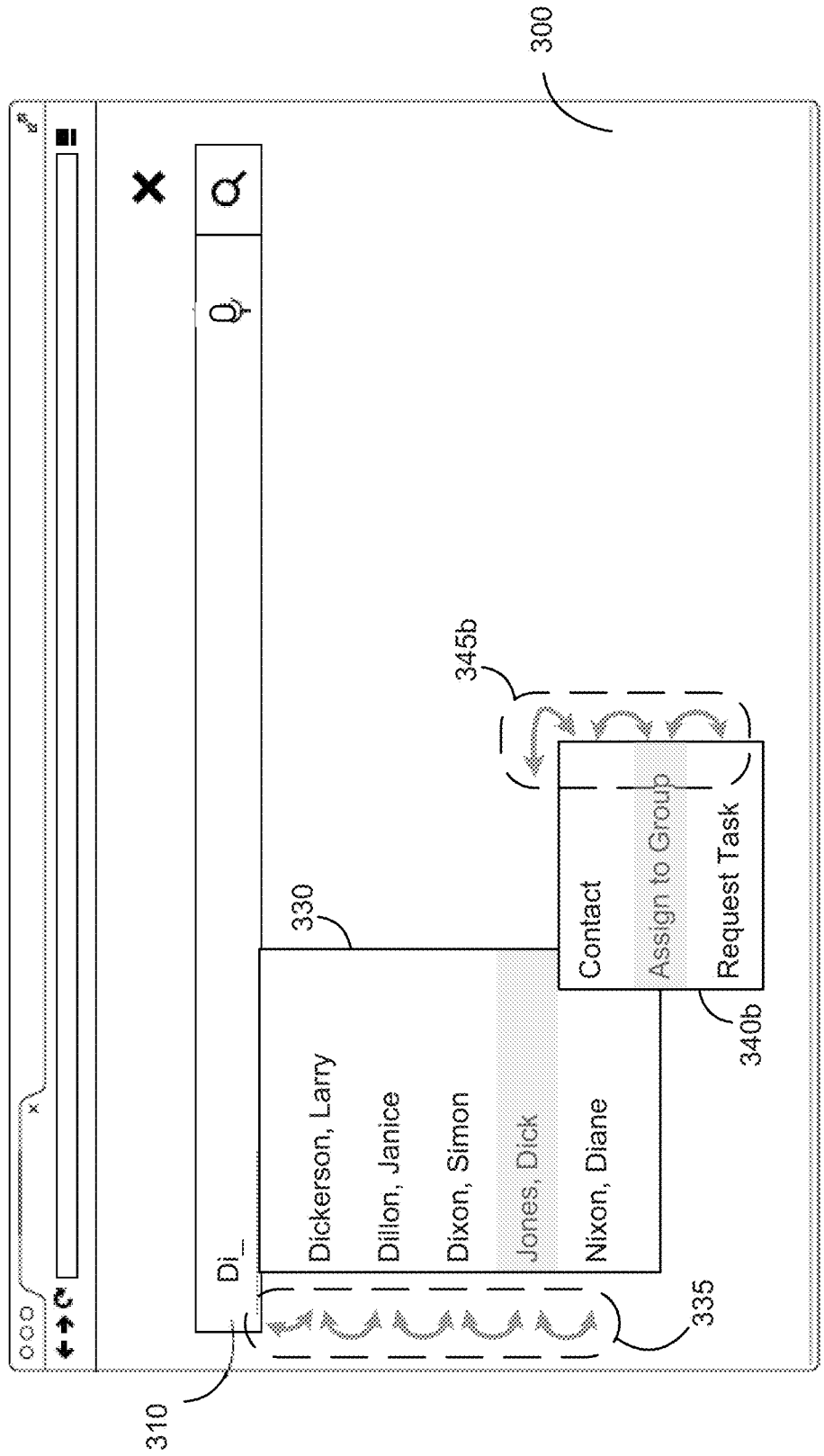

FIG. 3B is another graphical illustration of UI page 300 for a scenario in one embodiment wherein first list 330 is presented in response to the string "Di" being input at dialog box 310, but where an operator transitions a focus on an item of first list 330 representing a user "Jones, Dick." Such focus may enable a different list 340b to be displayed in page 300. For example, list 340b may be displayed in response to the item of the first list 330 being highlighted, hovered-over by a cursor and/or clicked on or otherwise selected. Of the items of first list 330, some or all items of the list 340b are each specific to the in-focus item representing user "Jones, Dick". In one embodiment, selection of an item of list 340b enables execution of a respective function corresponding to the user "Jones, Dick"—e.g., where such execution may take place without the user having to leave UI page 300. In the illustrative embodiment represented in FIG. 3A, the items of list 340b are variously selectable to allow an operator to contact the user "Jones, Dick," to assign the user "Jones, Dick" to an account, or to request a task for the user "Jones, Dick." However, the particular functionality provided by the items of list 340b are merely illustrative, and not limiting on certain embodiments.

A predefined second focus sequence 345b of page 300 (illustrated by the arrows shown in FIG. 3B) may include a focus on the "Jones, Dick" item of first list 330 and successive focuses on respective items of list 340b. Accordingly, the second focus sequence 345b may function as an alternative branch from the first focus sequence 335 at the "Jones, Dick" item of first list 330.

Figure 4A:
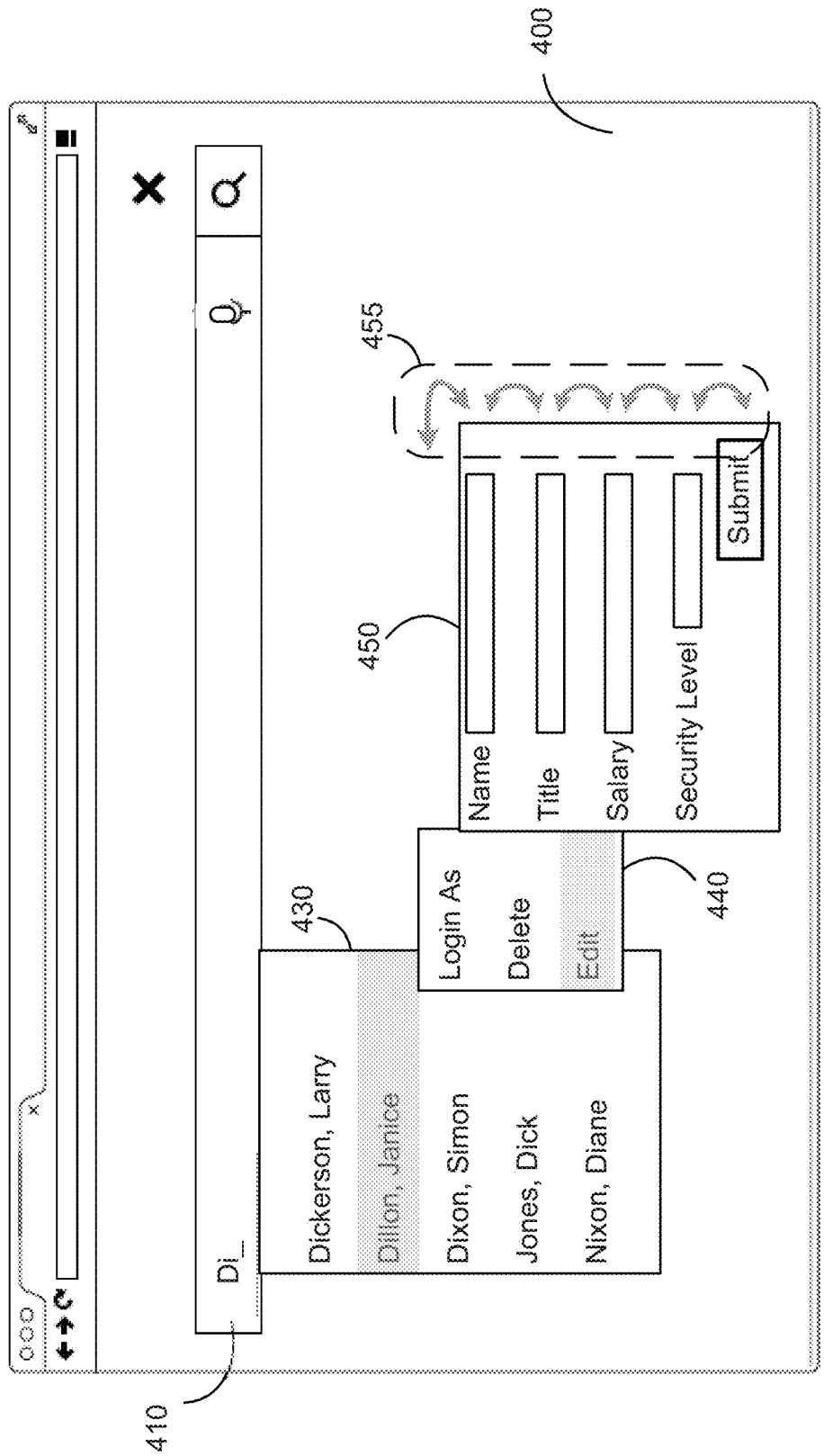
FIGS. 4A and 4B are graphical illustrations of various UI pages having functionality that may be provided by a system utilizing the search functionality as described herein.

FIG. 4A is a graphical illustration of a UI page 400 having a list that may be provided by a system utilizing the search functionality as described herein. UI page 400 may have some or all of the features of UI page 300, for example. In the example of FIG. 4A, a string of characters "Di" has been entered into dialog box 410, where a first list 430 of users is displayed based on the search string "Di". Focus on an item in list 430 representing the user "Dillon, Janice" may enable a second list 440 to be displayed in page 400. Although certain embodiments are not limited in this regard, list 440 may include some or all of the items of list 340, for example. Focus on an item of second list 440—e.g., where an "Edit" item is highlighted, hovered-over by a cursor and/or clicked on or otherwise selected—may enable a third list 450 to be displayed in page 400. Alternatively, focus on an item of second list 440 may result in performance of some corresponding function for the user "Dillon, Janice"—e.g., independent of any additional list, window or other UI element being displayed in page 400.

In the illustrative embodiment represented in FIG. 3A, the third list 340a displayed includes one or more UI elements each to allow for editing of respective account information associated with the user "Dillon, Janice". By way of illustration and not limitation, such account information may include a name of the user, a title of the user, a salary of the user and a security level of the user. However, third list 340a may provide for configuration of any of a variety of one or more additional or alternative types of parameters or other information, according to different embodiments. A "Submit" button (or other such UI element) of third list 340a may be selectable for submission of changes to the account information of user "Dillon, Janice."

Although certain embodiments are not limited in this regard, a predefined third focus sequence 455 of page 400 (illustrated by the arrows shown in FIG. 4A) may include a focus on the "Edit" item of second list 440 and successive focuses on respective items of third list 450. Accordingly, the third focus sequence 455 may function as a branch from the focus sequence 345a, for example. Different types of inputs may allow a user to variously transition a focus in along such a third focus sequence 455, between the focus sequence 345a and the third focus sequence 455, and/or along the third focus sequence 455. By way of illustration and not limitation, an up arrow key and a down arrow key may be used to transition focus in respective directions along the second focus sequence 345a, and may be additionally or alternatively used to transition focus in respective directions along the third focus sequence 455. A right arrow key and/or a left arrow key may be used to transition focus between the "Edit" item of second list 440 and an item of third list 450. In some embodiments, focus on a UI element of the third focus sequence 455 may be alternatively implemented other means—e.g. by a user selecting the UI element with a cursor.

Figure 4B:
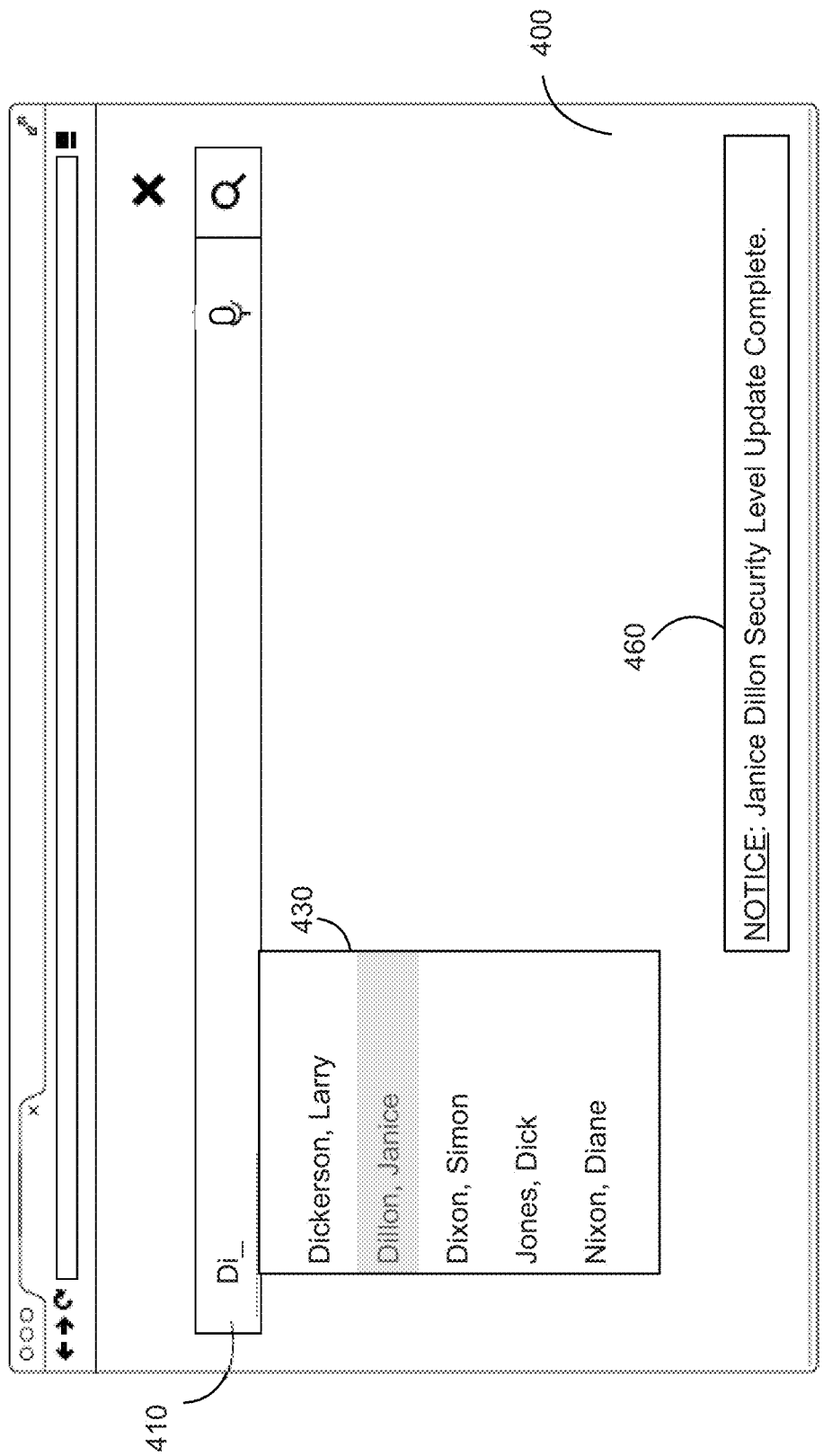

FIG. 4B is another graphical illustration of UI page 400 of FIG. 4A, for a scenario in one embodiment wherein an operator has submitted one or more updates to account information for the user "Dillon, Janice." In the example illustrated in FIG. 4B, the operator has updated security level information via third list 450. In response to such submission, an account management system (not shown) provides for display in UI page 400 a notice 460 indicating to the operator that the update has completed. Such updating and/or notification thereof may take place without the operator having to navigate away from UI page 400.

For example, execution of a function via third list 450 may automatically result in third list 450 and second list 440 being removed from UI page 400. Focus may automatically transition to an item of first list 430—e.g., the item representing the user "Dillon, Janice." In another embodiment, second list 440 (not shown) is not automatically removed from UI page 400 in response to execution of a function via third list 450, and focus may instead automatically transition to an item of second list 440.

Figure 5:
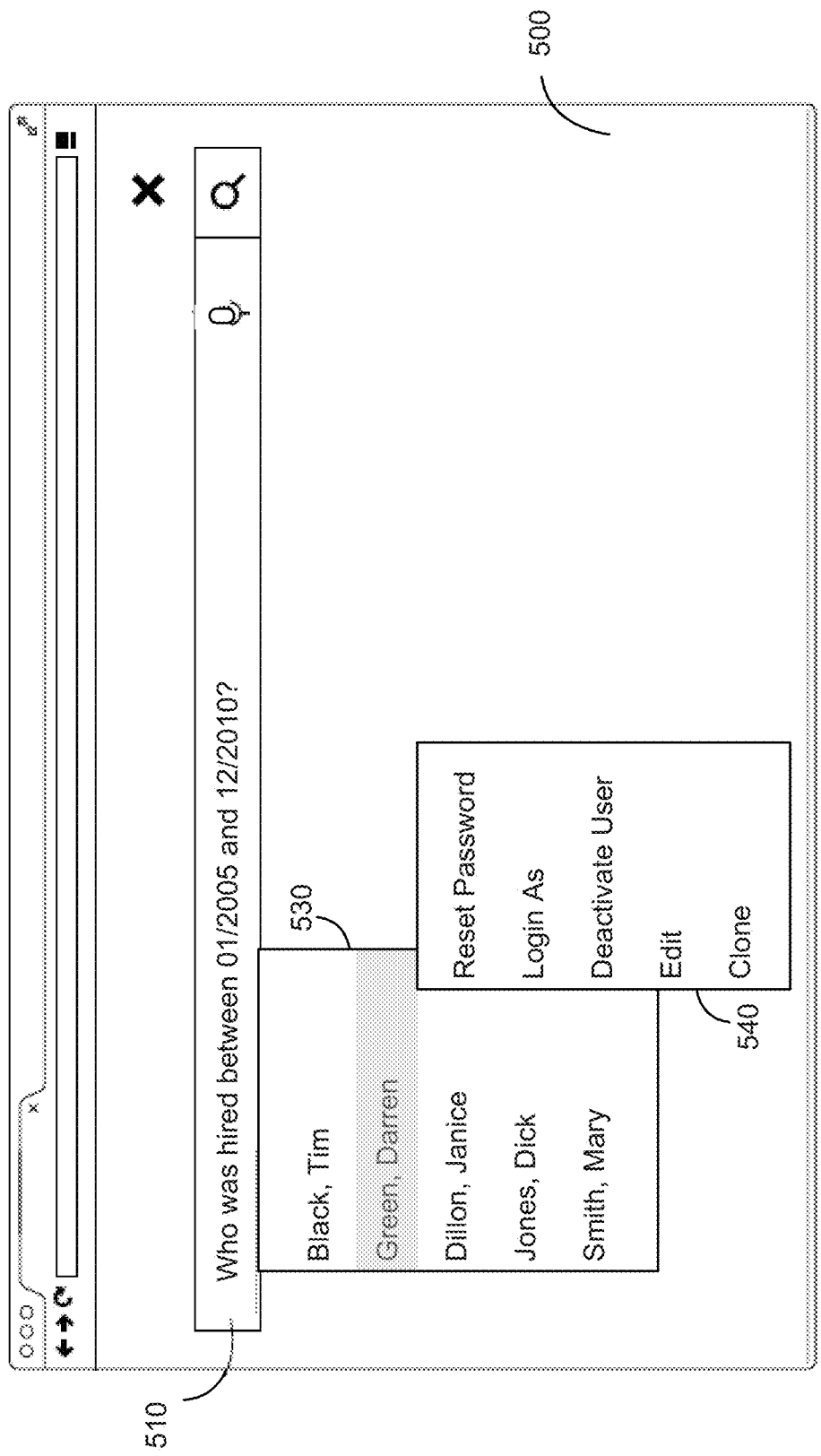
FIG. 5 is a graphical illustration of a UI page having functionality that may be provided by a system utilizing the search functionality as described herein.

FIG. 5 is a graphical illustration of a UI page 500 having a search input with suggested results provided by a system utilizing the search functionality as described herein. UI page 500 may provide search functionality such as that of UI page 200a, 200b, etc. In the example of FIG. 5, "Who was hired between January 2005 and December 2010" has been entered into dialog box 510. This may be a partial or a complete search and may have been entered by a keyboard or other alphanumeric input or via speech input. In one embodiment, phrases like this may be parsed and results may be provided in a first list 530 to answer the user's query. This mechanism allows an operator to receive the requested information in a more natural manner than would otherwise be possible.

A predefined focus sequence of page 500 (not shown) may include a focus on dialog box 510 and successive focuses on the respective items of first list 530. Focus on an item in list 530 may enable a second list 540 to be displayed in page 500—e.g., wherein, of the items of list 530, the second list 540 is specific to the item of first list 530 that is currently in-focus.

In the illustrative embodiment represented in FIG. 5, the items of second list 540 are variously selectable to allow an operator to reset a password of a user "Green, Darren," to login to a system as the user "Green, Darren," to deactivate the account of the user "Green, Darren," to edit the account of the user "Green, Darren," and to clone the account of the user "Green, Darren." However, the particular functionality provided by the items of second list 540 are merely illustrative, and not limiting on certain embodiments. In one embodiment, selection of an item of second list 540 enables execution of a respective function corresponding to the user "Green, Darren," where such execution may take place without the user having to leave UI page 500.

Figure 6:
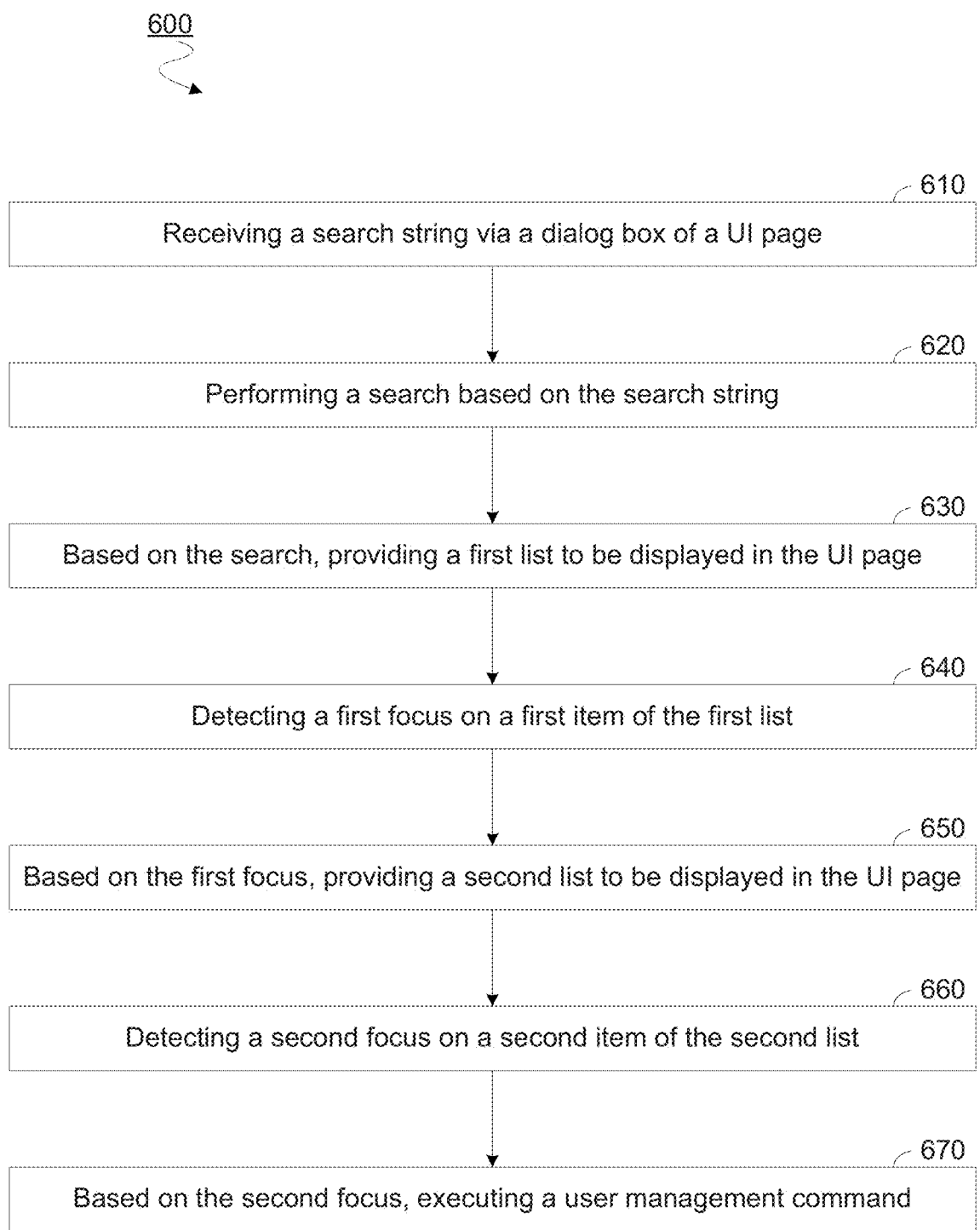
FIG. 6 is a flow diagram illustrating elements of a method for presenting search information according to an embodiment.

FIG. 6 illustrates elements of a method 600 for providing search information in UI page according to an embodiment. Method 600 may include or be based on an operator interacting with a UI page that provides search functionality features as variously described herein. In an embodiment, method 600 is a computer-implemented method performed based on (e.g., as part of) execution of an application that exchanges signals to generate a UI in a display device and/or to communicate in a network such as one including a multi-tenant system.

Method 600 may include, at 610, receiving a search string via a dialog box of a UI page. The search string may be provided via a keyboard, microphone, touchscreen or other such input mechanism. Based on the search string, method 600 may perform a search, at 620, to identify any users of a plurality of system users that may, in some respect, be indicated by the search string. For example, the search 620 may include, for each of the plurality of user, determining whether the search string matches at least a portion of information (e.g., a name, location, title, employer, etc.) associated with that user. The plurality of users may include users of a database, network, enterprise, entity and/or the like. In some embodiments, the plurality of users is determined at least in part based on one or more filters that, for example, may be configured with input provided via the UI page. The search at 620 may not itself be part of method 600, but may rather be part of another method (not shown) operating in conjunction with method 600.

The search at 620 may include accessing—e.g., via a network—one or more records or other resources (such as those of a multi-tenant system) to identify the items to appear in a first list. Such resources may be accessed from any of a variety of one or more databases, organizations, repositories, and/or other sources. Based on the search, method 600 may, at 630, provide a first list to be displayed in the UI page—e.g. including determining the first list by accessing one or more databases of an enterprise system, multitenant system and/or the like. Based on the search at 620, items to be included in first list may be identified dynamically during runtime operation of a computer system that is to display the UI page. The first list may comprise items that each include the search string, or are otherwise identified as being associated with the search string. For example, entering the name of the business may generate a list of employees of that business. Each item may identify or otherwise represent a user that, for example, is to serve as a respective search term for identifying one or more functions to be represented in a second list, wherein of the users represented by items of the first list, such one or more functions are specific to a user represented by a selected or otherwise in-focus item of the first list.

In some embodiments, one or more items of the first list each comprise respective context information other than a user name—e.g., where such context information includes contact information, a photograph, trademark or other graphic, status information and/or the like. The first list may be generated as part of an autocomplete functionality to suggest one or more possible results in the first list while a search string is being entered via the dialog box. Alternatively, such a first list may be displayed only after a "Return" key, "Enter" key or other such input is provided. During a display of the first list in the UI page, a predefined first focus sequence of the UI page may include a focus on the dialog box and an order of focuses each on a respective item of the first list. By way of illustration and not limitation, an up arrow key and a down arrow key may be used to navigate (respectively) up and down the first list and, in an embodiment, to further transition focus between the first list and the dialog box. Accordingly, the first list may serve functionally as a child of the dialog box that is based on (e.g., may change with) the string currently input at the dialog box.

Method 600 may further comprise, at 640, detecting the first focus on a first item of the first list. Such focus may be in response to, for example, a cursor hovering over the first item. Although certain embodiments are not limited in this regard, such focus may additionally or alternatively be based on the first item being clicked on, tapped on or otherwise selected. In one embodiment, focus on and/or selection of the first item determines a user that is to be the subject of a subsequently executed user management command.

Based on the first focus detected at 640, method 600 may, at 650, provide a second list to be displayed in the UI page—e.g. including determining the second list by accessing one or more databases accessed at 630. For example, method 600 may include additional query, search and/or other operations (not shown) to identify one or more user management commands to be represented each as a respective item of the second list. Inclusion of such user management commands may be determined based on a particular employer, role, title or other characteristic associated with the first user. Alternatively or in addition, such inclusion may be determined based on access privilege of a person operating the UI page.

The second list may be displayed, for example, as a drop-down list or other UI element adjoining the first item of the first list. In an embodiment, the second list is displayed in response to a cursor hovering over the first item, and prior to any selection of the first item via the cursor. The second list may include one or more items that are variously selectable each to invoke a respective user management command corresponding to the user represented by the first item. During a display of the second list in the UI page, a predefined second focus sequence of the UI page may include a focus on the first item and one or more focuses each on a respective item of the second list. In such an embodiment, the second focus sequence may branch from the first focus sequence.

Method 600 may further comprise, at 660, detecting a second focus on a second item of the second list. For example, a display of the second item in the UI page may be hovered over by a cursor and/or finally selected (e.g., clicked on, tapped on and/or the like) to identify a corresponding user management command. Based on the second focus, method 600 may, at 670, execute a user management command represented by the second item. The executing based on the second focus at 670 may include providing a third list to be displayed in the UI page. The third list may include one or more items each representing respective information (e.g., parameters) to be provided for execution of the user management command. Additional input may be provided via a display of the third list in the UI page to provide a configuration to execute the user management command. During a display of such a third list in the UI page, a predefined third focus sequence of the UI page may include a focus on the second item of the second list and one or more focuses each on a respective item of the third list.

The second list may be automatically removed from the UI page in response to execution of the user management command—e.g., where an item of the first list is automatically put in-focus in response to execution of the first user management command. Alternatively, the display of the second list may be updated in response to execution of the user management command. For example, one or more items of the displayed second list may be removed, shaded, updated or otherwise modified.

Figure 7:
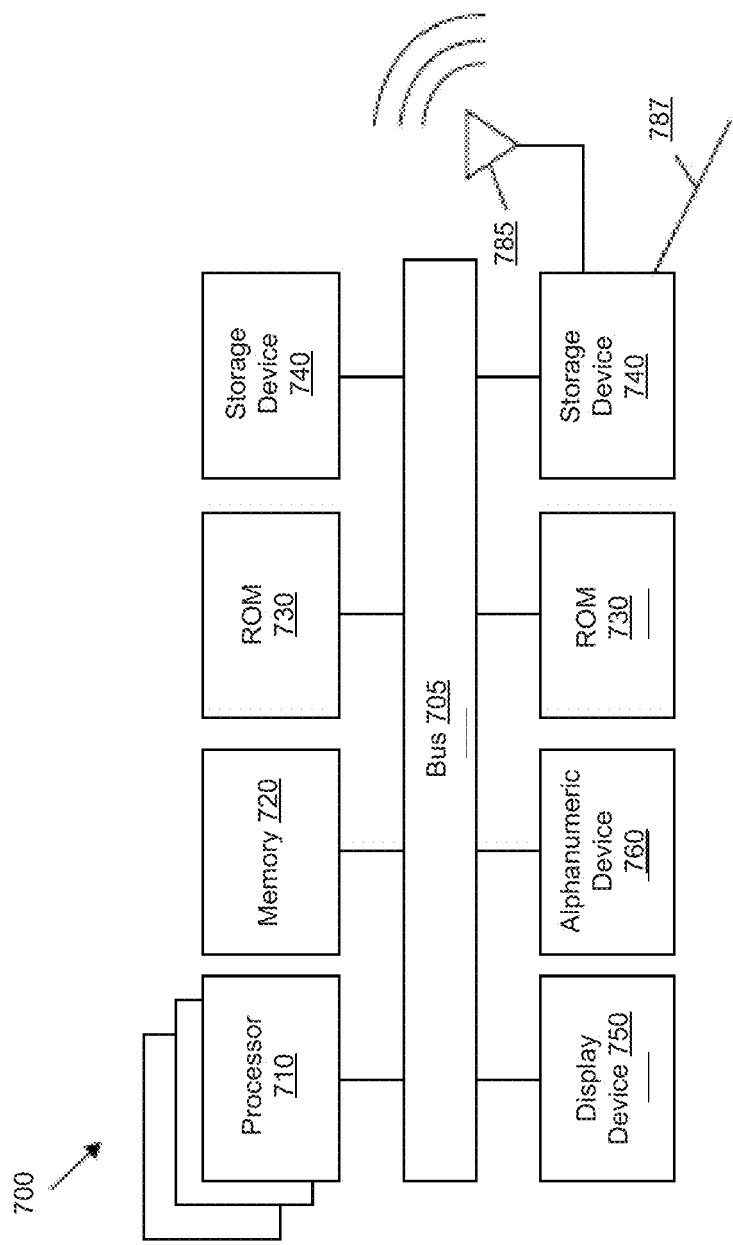
FIG. 7 is a high-level functional block diagram illustrating elements of a computer system according to an embodiment.

FIG. 7 is a block diagram of one embodiment of an electronic computing system that can be used as part of a combined search and content creation mechanism. The electronic system illustrated in FIG. 7 is intended to represent a range of electronic systems (either wired or wireless) including, for example, desktop computer systems, laptop computer systems, cellular telephones, tablets including cellular-enabled PDAs, set top boxes, thin devices, etc. Alternative electronic systems may include more, fewer and/or different components.

Electronic system 700 includes bus 705 or other communication device to communicate information, and a processor 710 coupled to bus 705 that may process information. While electronic system 700 is illustrated with a single processor, electronic system 700 may include multiple processors and/or co-processors. Electronic system 700 further may include random access memory (RAM) or other dynamic storage device (represented by the illustrative main memory 720), coupled to bus 705 and may store information and instructions that may be executed by processor 710. Main memory 720 may also be used to store temporary variables or other intermediate information during execution of instructions by processor 710.

Electronic system 700 may also include read only memory (ROM) 730 and/or other static storage device coupled to bus 705 that may store static information and instructions for processor 710. Data storage device 740 may be coupled to bus 705 to store information and instructions. Data storage device 740 such as a magnetic disk or optical disc and corresponding drive may be coupled to electronic system 700.

Electronic system 700 may also be coupled via bus 705 to display device 750, such as a cathode ray tube (CRT) or liquid crystal display (LCD), to display information to a user. Alphanumeric input device 760, including alphanumeric and other keys, may be coupled to bus 705 to communicate information and command selections to processor 710. Another type of user input device is cursor control 770, such as a mouse, a trackpad, or cursor direction keys to communicate direction information and command selections to processor 710 and to control cursor movement on display 750.

Electronic system 700 further may include network interface(s) 780 to provide access to a network, such as a local area network. Network interface(s) 780 may include, for example, a wireless network interface having antenna 785, which may represent one or more antenna(e). Network interface(s) 780 may also include, for example, a wired network interface to communicate with remote devices via network cable 787, which may be, for example, an Ethernet cable, a coaxial cable, a fiber optic cable, a serial cable, or a parallel cable.

In one embodiment, network interface(s) 780 may provide access to a local area network, for example, by conforming to IEEE 802.11b and/or IEEE 802.11g standards, and/or the wireless network interface may provide access to a personal area network, for example, by conforming to Bluetooth standards. Other wireless network interfaces and/or protocols can also be supported.

IEEE 802.11b corresponds to IEEE Std. 802.11b-1999 entitled "Local and Metropolitan Area Networks, Part 11: Wireless LAN Medium Access Control (MAC) and Physical Layer (PHY) Specifications: Higher-Speed Physical Layer Extension in the 2.4 GHz Band," approved Sep. 16, 1999 as well as related documents. IEEE 802.11g corresponds to IEEE Std. 802.11g-2003 entitled "Local and Metropolitan Area Networks, Part 11: Wireless LAN Medium Access Control (MAC) and Physical Layer (PHY) Specifications, Amendment 4: Further Higher Rate Extension in the 2.4 GHz Band," approved Jun. 27, 2003 as well as related documents. Bluetooth protocols are described in "Specification of the Bluetooth System: Core, Version 1.1," published Feb. 22, 2001 by the Bluetooth Special Interest Group, Inc. Associated as well as previous or subsequent versions of the Bluetooth standard may also be supported.

In addition to, or instead of, communication via wireless LAN standards, network interface(s) 780 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Figure 8:
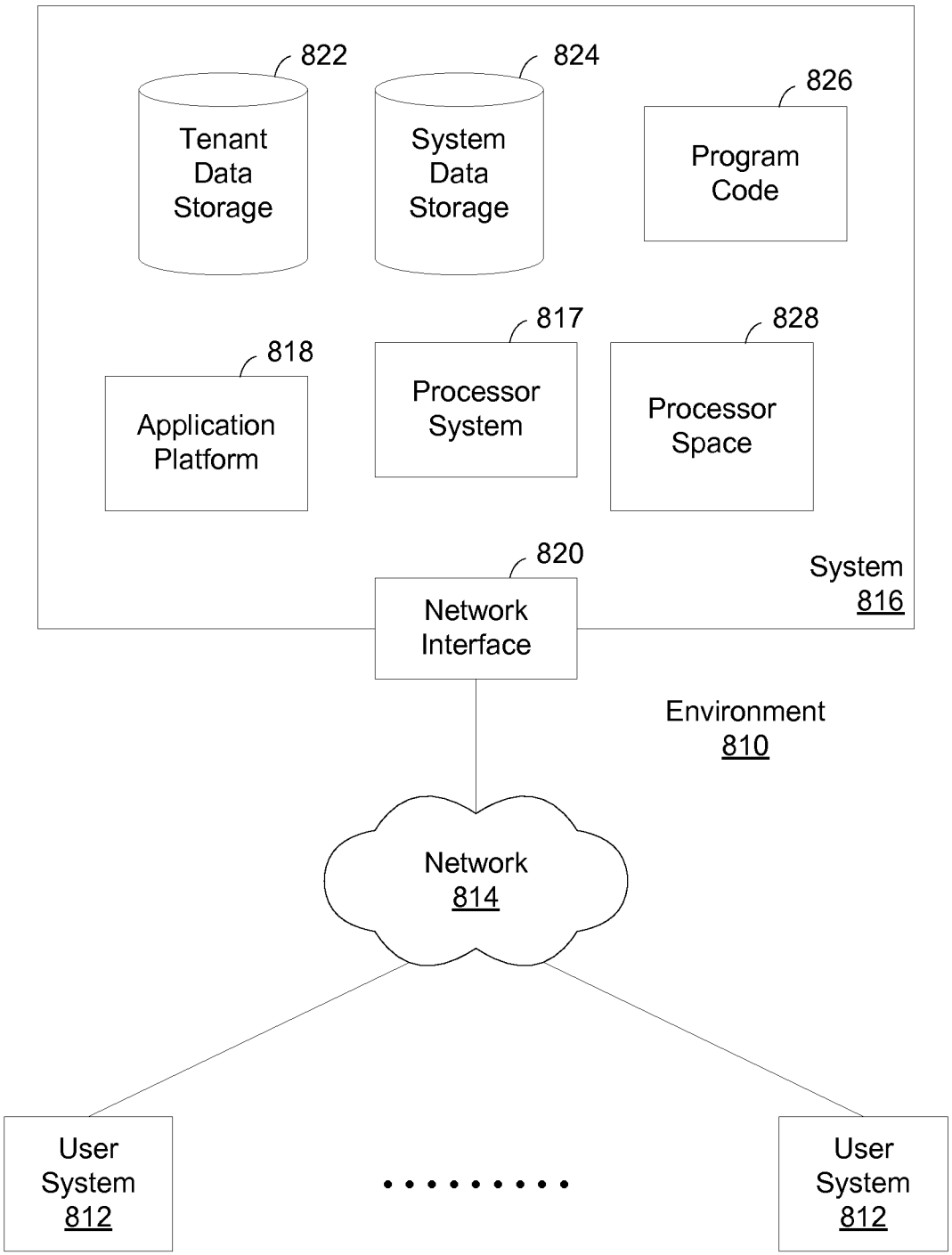
FIG. 8 is a high-level functional block diagram illustrating elements of an environment for providing an on-demand database service according to an embodiment.

FIG. 8 illustrates a block diagram of an environment 810 wherein an on-demand database service might be used. Environment 810 may include user systems 812, network 814, system 816, processor system 817, application platform 818, network interface 820, tenant data storage 822, system data storage 824, program code 826, and process space 828. In other embodiments, environment 810 may not have all of the components listed and/or may have other elements instead of, or in addition to, those listed above.

Environment 810 is an environment in which an on-demand database service exists. User system 812 may be any machine or system that is used by a user to access a database user system. For example, any of user systems 812 can be a handheld computing device, a mobile phone, a laptop computer, a work station, and/or a network of computing devices. As illustrated in herein FIG. 8 (and in more detail in FIG. 9) user systems 812 might interact via a network 814 with an on-demand database service, which is system 816.

An on-demand database service, such as system 816, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). As used herein, the term multi-tenant database system refers to those systems in which various elements of hardware and software of the database system may be shared by one or more customers. For example, a given application server may simultaneously process requests for a great number of customers, and a given database table may store rows for a potentially much greater number of customers. Accordingly, "on-demand database service 816" and "system 816" will be used interchangeably herein. A database image may include one or more database objects. A relational database management system (RDMS) or the equivalent may execute storage and retrieval of information against the database object(s). Application platform 818 may be a framework that allows the applications of system 816 to run, such as the hardware and/or software, e.g., the operating system. In an embodiment, on-demand database service 816 may include an application platform 818 that enables creation, managing and executing one or more applications developed by the provider of the on-demand database service, users accessing the on-demand database service via user systems 812, or third party application developers accessing the on-demand database service via user systems 812.

The users of user systems 812 may differ in their respective capacities, and the capacity of a particular user system 812 might be entirely determined by permissions (permission levels) for the current user. For example, where a salesperson is using a particular user system 812 to interact with system 816, that user system may have the capacities allotted to that salesperson. However, while an administrator is using that user system to interact with system 816, that user system may have the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 814 is any network or combination of networks of devices that communicate with one another. For example, network 814 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 812 might communicate with system 816 using TCP/IP and, at a higher network level, use other common Internet protocols to communicate, such as HTTP, FTP, AFS, WAP, etc. In an example where HTTP is used, user system 812 might include an HTTP client commonly referred to as a "browser" for sending and receiving HTTP messages to and from an HTTP server at system 816. Such an HTTP server might be implemented as the sole network interface between system 816 and network 814, but other techniques might be used as well or instead. In some implementations, the interface between system 816 and network 814 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 816, shown in FIG. 8, implements a web-based customer relationship management (CRM) system. For example, in one embodiment, system 816 includes application servers configured to implement and execute CRM software applications as well as provide related data, code, forms, webpages and other information to and from user systems 812 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 816 implements applications other than, or in addition to, a CRM application. For example, system 816 may provide tenant access to multiple hosted (standard and custom) applications, including a CRM application. User (or third party developer) applications, which may or may not include CRM, may be supported by the application platform 818, which manages creation, storage of the applications into one or more database objects and executing of the applications in a virtual machine in the process space of the system 816.

One arrangement for elements of system 816 is shown in FIG. 8, including a network interface 820, application platform 818, tenant data storage 822 for tenant data 823, system data storage 824 for system data 825 accessible to system 816 and possibly multiple tenants, program code 826 for implementing various functions of system 816, and a process space 828 for executing MTS system processes and tenant-specific processes, such as running applications as part of an application hosting service. Additional processes that may execute on system 816 include database indexing processes.

Several elements in the system shown in FIG. 8 include conventional, well-known elements that are explained only briefly here. For example, each user system 812 could include a desktop personal computer, workstation, laptop, PDA, cell phone, or any wireless access protocol (WAP) enabled device or any other computing device capable of interfacing directly or indirectly to the Internet or other network connection. User system 812 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 812 to access, process and view information, pages and applications available to it from system 816 over network 814. Each user system 812 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 816 or other systems or servers. For example, the user interface device can be used to access data and applications hosted by system 816, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 812 and all of its components are operator configurable using applications, such as a browser, including computer code run using a processor. Similarly, system 816 (and additional instances of an MTS, where more than one is present) and all of their components might be operator configurable using application(s) including computer code to run using a central processing unit such as processor system 817, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 816 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

According to one embodiment, each system 816 is configured to provide webpages, forms, applications, data and media content to user (client) systems 812 to support the access by user systems 812 as tenants of system 816. As such, system 816 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 9:
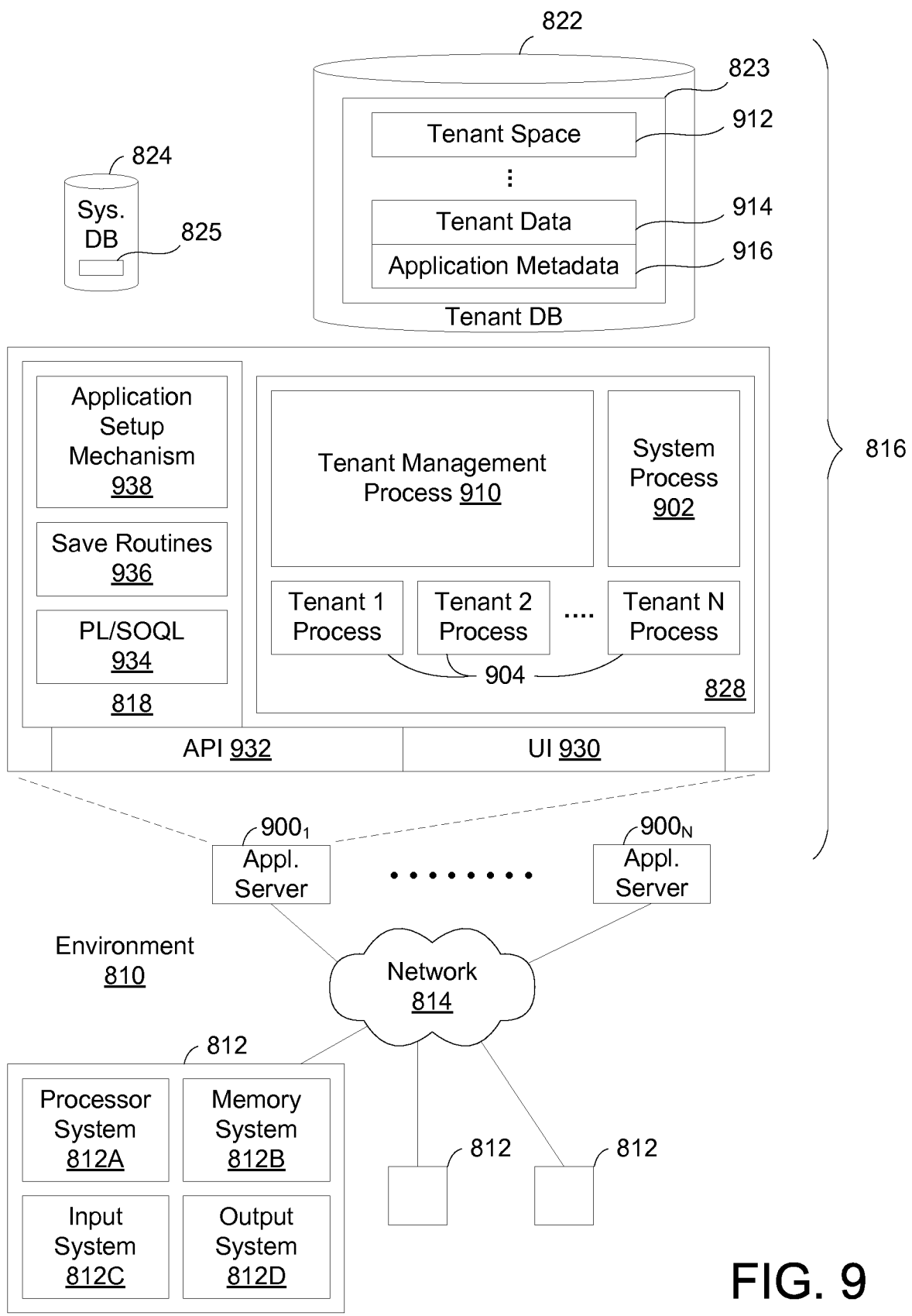
FIG. 9 is a high-level functional block diagram illustrating elements of an environment of FIG. 8 and various possible interconnections between these elements according to one embodiment.

FIG. 9 also illustrates environment 810. However, in FIG. 9 elements of system 816 and various interconnections in an embodiment are further illustrated. FIG. 9 shows that user system 812 may include processor system 812A, memory system 812B, input system 812C, and output system 812D. FIG. 9 shows network 814 and system 816. FIG. 9 also shows that system 816 may include tenant data storage 822, tenant data 823, system data storage 824, system data 825, User Interface (UI) 930, Application Program Interface (API) 932, PL/SOQL 934, save routines 936, application setup mechanism 938, applications servers $900_1$-$900_N$, system process space 902, tenant process spaces 904, tenant management process space 910, tenant storage space 912, tenant data 914, and application metadata 916. In other embodiments, environment 810 may not have the same elements as those listed above and/or may have other elements instead of, or in addition to, those listed above.

User system 812, network 814, system 816, tenant data storage 822, and system data storage 824 were discussed above in FIG. 8. Regarding user system 812, processor system 812A may be any combination of one or more processors. Memory system 812B may be any combination of one or more memory devices, short term, and/or long term memory. Input system 812C may be any combination of input devices, such as one or more keyboards, mice, trackballs, scanners, cameras, and/or interfaces to networks. Output system 812D may be any combination of output devices, such as one or more monitors, printers, and/or interfaces to networks. As shown by FIG. 9, system 816 may include a network interface 820 (of FIG. 8) implemented as a set of HTTP application servers 900, an application platform 818, tenant data storage 822, and system data storage 824. Also shown is system process space 902, including individual tenant process spaces 904 and a tenant management process space 910. Each application server 900 may be configured to tenant data storage 822 and the tenant data 823 therein, and system data storage 824 and the system data 825 therein to serve requests of user systems 812. The tenant data 823 might be divided into individual tenant storage spaces 912, which can be either a physical arrangement and/or a logical arrangement of data. Within each tenant storage space 912, tenant data 914 and application metadata 916 might be similarly allocated for each user. For example, a copy of a user's most recently used (MRU) items might be stored to tenant data 914. Similarly, a copy of MRU items for an entire organization that is a tenant might be stored to tenant storage space 912. A UI 930 provides a user interface and an API 932 provides an application programmer interface to system 816 resident processes to users and/or developers at user systems 812. The tenant data and the system data may be stored in various databases, such as one or more Oracle™ databases.

Application platform 818 includes an application setup mechanism 938 that supports application developers' creation and management of applications, which may be saved as metadata into tenant data storage 822 by save routines 936 for execution by subscribers as one or more tenant process spaces 904 managed by tenant management process 910 for example. Invocations to such applications may be coded using PL/SOQL 934 that provides a programming language style interface extension to API 932. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 916 for the subscriber making the invocation and executing the metadata as an application in a virtual machine.

Each application server 900 may be communicably coupled to database systems, e.g., having access to system data 825 and tenant data 823, via a different network connection. For example, one application server $900_1$ might be coupled via the network 814 (e.g., the Internet), another application server $900_{N-1}$ might be coupled via a direct network link, and another application server $900_N$ might be coupled by yet a different network connection. Transfer Control Protocol and Internet Protocol (TCP/IP) are typical protocols for communicating between application servers 900 and the database system. However, it will be apparent to one skilled in the art that other transport protocols may be used to optimize the system depending on the network interconnect used.

In certain embodiments, each application server 900 is configured to handle requests for any user associated with any organization that is a tenant. Because it is desirable to be able to add and remove application servers from the server pool at any time for any reason, there is preferably no server affinity for a user and/or organization to a specific application server 900. In one embodiment, therefore, an interface system implementing a load balancing function (e.g., an F5 Big-IP load balancer) is communicably coupled between the application servers 900 and the user systems 812 to distribute requests to the application servers 900. In one embodiment, the load balancer uses a least connections algorithm to route user requests to the application servers 900. Other examples of load balancing algorithms, such as round robin and observed response time, also can be used. For example, in certain embodiments, three consecutive requests from the same user could hit three different application servers 900, and three requests from different users could hit the same application server 900. In this manner, system 816 is multi-tenant, wherein system 816 handles storage of, and access to, different objects, data and applications across disparate users and organizations.

As an example of storage, one tenant might be a company that employs a sales force where each salesperson uses system 816 to manage their sales process. Thus, a user might maintain contact data, leads data, customer follow-up data, performance data, goals and progress data, etc., all applicable to that user's personal sales process (e.g., in tenant data storage 822). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 816 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 816 might also maintain system level data usable by multiple tenants or other data. Such system level data might include industry reports, news, postings, and the like that are sharable among tenants.

In certain embodiments, user systems 812 (which may be client systems) communicate with application servers 900 to request and update system-level and tenant-level data from system 816 that may require sending one or more queries to tenant data storage 822 and/or system data storage 824. System 816 (e.g., an application server 900 in system 816) automatically generates one or more SQL statements (e.g., one or more SQL queries) that are designed to access the desired information. System data storage 824 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A computer-implemented method comprising:
   displaying a first list in a user interface (UI) page including one or more items each representing a respective user name;
   detecting a first focus in the UI page on a first item of the first list;
   based on the first focus, accessing one or more databases to determine a second list to be displayed in the UI page, the second list including a first management command list associated with a metadata type represented by the first item, wherein the first management command list includes a first management command to perform a first editing function on a user name represented by the first item;
   during a display of the second list in the UI page, detecting a second focus in the UI page on a first management command indicating the first editing function to be performed on the user name represented by the first item;
   providing a third list to be displayed in the UI page based on the second focus, the third list including one or more configuration parameters to be provided as input to the first editing function;
   executing a first user management command in response to a selection of the one or more configuration parameters to perform the first editing function using the one or more configuration parameters, wherein the first, second and third lists are displayed on the UI page during execution of the first management command;
   automatically removing the second list and the third list from displaying on the UI page in response to executing the first user management command; and
   automatically returning to the detected first focus of the first item in the first list in response to the executing the first user management command and removing the second list and the third list from displaying on the UI page.

2. The method of claim 1, wherein, during a display of the first list in the UI page, a predefined first focus sequence of the UI page includes a focus on the dialog box and focuses each on a respective items of the first list.

3. The method of claim 1, wherein, during a display of the second list in the UI page, a predefined second focus sequence of the UI page includes a focus on the first item and one or more focuses each on a respective item of the second list.

4. The method of claim 3, wherein, during a display of the first list in the UI page, a predefined first focus sequence of the UI page includes a focus on the dialog box and focuses each on a respective items of the first list, wherein the second focus sequence branches from the first focus sequence.

5. The method of claim 1, wherein, during a display of the third list in the UI page, a predefined third focus sequence of the UI page includes a focus on the second item and one or more focuses each on a respective item of the third list.

6. The method of claim 1, wherein the second list is displayed in response to a cursor hovering over the first item, and prior to any selection of the first item via the cursor.

7. The method of claim 1, further comprising:
receiving via the UI page search filter information to limit a search based on the search string.

8. A non-transitory computer-readable medium having stored thereon instructions capable of, when executed by one or more processors, providing a multitenant environment to:
display a first list in a user interface (UI) page including one or more items each representing a respective user name;
detect a first focus in the UI page on a first item of the first list;
based on the first focus, access one or more databases to determine a second list to be displayed in the UI page, the second list including a first management command list associated with a metadata type represented by the first item, wherein the first management command list includes a first management command to perform a first editing function on a user name represented by the first item;
during a display of the second list in the UI page, detect a second focus in the UI page on a first management command indicating the first editing function to be performed on the user name represented by the first item;
provide a third list to be displayed in the UI page based on the second focus, the third list including configuration parameters to be provided as input to the first editing function;
execute a first user management command in response to a selection of the one or more configuration parameters to perform the first editing function using the one or more configuration parameters, wherein the first, second and third lists are displayed on the UI page during execution of the first management command;
automatically remove the second list and the third list from displaying on the UI page in response to executing the first user management command; and
automatically return to the detected first focus of the first item in the first list in response to the executing the first user management command and removing the second list and the third list from displaying on the UI page.

9. The non-transitory computer-readable medium of claim 8, wherein, during a display of the first list in the UI page, a predefined first focus sequence of the UI page includes a focus on the dialog box and focuses each on a respective items of the first list.

10. The non-transitory computer-readable medium of claim 8, wherein, during a display of the second list in the UI page, a predefined second focus sequence of the UI page includes a focus on the first item and one or more focuses each on a respective item of the second list.

11. The non-transitory computer-readable medium of claim 10, wherein, during a display of the first list in the UI page, a predefined first focus sequence of the UI page includes a focus on the dialog box and focuses each on a respective items of the first list, wherein the second focus sequence branches from the first focus sequence.

12. An apparatus comprising:
one or more processors to perform:
displaying a first list in a user interface (UI) page including one or more items each representing a respective user name;
detecting a first focus in the UI page on a first item of the first list;
accessing, based on the first focus, one or more databases to determine a second list to be displayed in the UI page, the second list including first management command list associated with a metadata type represented by the first item, wherein the first management command list includes a first management command to perform a first editing function on a user name represented by the first item;
detecting, during a display of the second list in the UI page, a second focus in the UI page on a first management command indicating the first editing function to be performed on the user name represented by the first item;
providing a third list to be displayed in the UI page based on the second focus, the third list including one or more configuration parameters to be provided as input to the first editing function;
executing a first user management command in response to a selection of the one or more configuration parameters to perform the first editing function using the one or more configuration parameters, wherein the first, second and third lists are displayed on the UI page during execution of the first management command;
automatically removing the second list and the third list from displaying on the UI page in response to executing the first user management command; and
automatically returning to the detected first focus of the first item in the first list in response to the executing the first user management command and removing the second list and the third list from displaying on the UI page.

13. The apparatus of claim 12, wherein, during a display of the first list in the UI page, a predefined first focus sequence of the UI page includes a focus on the dialog box and focuses each on a respective items of the first list.

14. The apparatus of claim 12, wherein, during a display of the second list in the UI page, a predefined second focus sequence of the UI page includes a focus on the first item and one or more focuses each on a respective item of the second list.

15. The apparatus of claim 14, wherein, during a display of the first list in the UI page, a predefined first focus sequence of the UI page includes a focus on the dialog box and focuses each on a respective items of the first list, wherein the second focus sequence branches from the first focus sequence.

* * * * *